US010663383B2

(12) United States Patent
Barraclough et al.

(10) Patent No.: US 10,663,383 B2
(45) Date of Patent: May 26, 2020

(54) STRESS CELL HAVING FIRST AND SECOND ELEMENTS HAVING FIRST AND SECOND VARIABLE LENGTHS

(71) Applicants: Razorbill Instruments Limited, Edinburgh (GB); Max Planck Gesellschaft zur Foerderung der Wissenschaften eV, Munich (DE)

(72) Inventors: Jack Matthew Barraclough, Edinburgh (GB); Clifford William Hicks, Dresden (DE); Alexander Steppke, Dresden (DE); Mark Barber, Palo Alto, CA (US)

(73) Assignees: Razorbill Instruments Limited, Edinburgh (GB); Max Planck Gesellschaft zur Foerderung der Wissenschaften eV, Munich (DE)

( * ) Notice: Subject to any disclaimer, the term of this patent is extended or adjusted under 35 U.S.C. 154(b) by 0 days.

(21) Appl. No.: 16/604,492

(22) PCT Filed: May 30, 2018

(86) PCT No.: PCT/GB2018/051458
§ 371 (c)(1),
(2) Date: Oct. 10, 2019

(87) PCT Pub. No.: WO2019/012243
PCT Pub. Date: Jan. 17, 2019

(65) Prior Publication Data
US 2020/0116607 A1    Apr. 16, 2020

(30) Foreign Application Priority Data

Jul. 14, 2017   (GB) .................... 1711384.6

(51) Int. Cl.
*G01N 3/18*    (2006.01)

(52) U.S. Cl.
CPC ....... *G01N 3/18* (2013.01); *G01N 2203/0051* (2013.01); *G01N 2203/0228* (2013.01)

(58) Field of Classification Search
None
See application file for complete search history.

(56) References Cited

U.S. PATENT DOCUMENTS

| 5,056,370 A | * | 10/1991 | Maier ................. G01M 5/0058 73/794 |
| 6,614,627 B1 | | 9/2003 | Shimizu et al. |

(Continued)

FOREIGN PATENT DOCUMENTS

WO    WO-2017/025730 A1    2/2017

OTHER PUBLICATIONS

International Searching Authority, International Search Report and Written Opinion, dated Aug. 21, 2018, (14 pages), European Patent Office, Rijswijk, Netherlands.

(Continued)

*Primary Examiner* — Natalie Huls
*Assistant Examiner* — Jermaine L Jenkins
(74) *Attorney, Agent, or Firm* — Alston & Bird LLP (57) ABSTRACT

The present disclosure relates to an apparatus and methods for applying a force on a sample. In particular, the present disclosure relates to a stress cell (200) comprising a frame (205); an actuator arrangement (210) coupled to the frame; and a coupler (220) for coupling the actuator arrangement to the sample (230). The coupler (220) includes a first coupler portion connected to the actuator arrangement (210) and a second coupler portion connectable to the sample (230). The first coupler portion is flexibly coupled to the frame. The actuator arrangement (210) comprises a first element (214) having a first variable length and a second element (212) having a second variable length, and is adapted to vary a (Continued)

difference between the first length and the second length to provide the force.

18 Claims, 7 Drawing Sheets

(56) References Cited

U.S. PATENT DOCUMENTS

| | | | | |
|---|---|---|---|---|
| 7,770,467 | B1* | 8/2010 | Halderman | G01N 3/04 73/849 |
| 8,006,568 | B2* | 8/2011 | Halderman | G01N 3/04 73/818 |
| 8,544,340 | B1* | 10/2013 | Ardelean | G01N 3/20 73/849 |
| 8,863,584 | B2* | 10/2014 | Kawano | G01N 3/08 73/788 |
| 8,863,585 | B2* | 10/2014 | Wang | G01N 3/34 73/812 |
| 10,254,206 | B2* | 4/2019 | Schaefer | G01N 3/04 |
| 10,444,131 | B2* | 10/2019 | Kong | G01N 3/20 |
| 2002/0170360 | A1* | 11/2002 | Anand | G01N 3/20 73/849 |
| 2010/0000329 | A1* | 1/2010 | Lorenz | G01N 3/04 73/856 |
| 2012/0067134 | A1* | 3/2012 | Bell | G02F 1/1309 73/800 |

OTHER PUBLICATIONS

International Preliminary Examining Authority, International Preliminary Report on Patentability, dated Jul. 12, 2019, (26 pages), European Patent Office, Rijswijk, Netherlands.

Intellectual Property Office, Great Britain Search Report for Great Patent Application No. GB1711384.6, dated Jan. 16, 2018, (4 pages), Glasgow, United Kingdom.

Chu, Jiun-Haw et al. "Divergent Nematic Susceptibility in an Iron Arsenide Superconductor," *Science*, vol. 337, No. 6095, Aug. 10, 2012, pp. 710-712. XP055498988. ISSN: 0036-8075. DOI: 10.1126/science.1221713.

Hicks, Clifford W. et al. "Piezoelectric-Based Apparatus for Strain Tuning," *Review of Scientific Instruments*, vol. 85, No. 6, Jun. 18, 2014, (9 pages). DOI: 10.1063/1.4881611.

Brodsky, Daniel O. et al. "Strain and Vector Magnetic Field Tuning of the Anomalous Phase In $Sr_3Ru_2O_7$," *Science*, vol. 3, No. 2, Feb. 3, 2017, pp. 109. XP055498995. ISSN: 0036-8075. DOI: 10.1126/sciadv.1501804.

Hicks, Clifford S. "Strong Increase of $T_c$ of $Sr_2RuO_4$ Under Both Tensile and Compressive Strain," *Science*, vol. 344, Issue 6181, Apr. 18, 2014, pp. 283-285. DOI: 10.1126/science.1248292.

Takeshita, Nao et al. "Gigantic Anisotropic Uniaxial Pressure Effect on Superconductivity Within the $CuO_2$ Plane of $LA_{1.64}Eu_{0.2}Sr_{0.16}CuO_4$: Strain Control of Stripe Critically," *Journal of the Physical Society of Japan*, vol. 73, No. 5, May 2004, pp. 1123-1126. DOI: 10/1143/JPSJ.73.1123.

Chu, Jiun-Haw et al. "In-Plane Resistivity Anistotropy in an Underdoped Iron Arsenide Superconductor," *Science*, vol. 329, Aug. 13, 2010, pp. 824-826. DOI: 10.1126/SCIENCE.1190482.

Shayegan, M. et al. "Low-Temperature, In Situ Tunable, Uniaxial Stress Measurements in Semiconductors Using a Piezoelectric Acuator," *Applied Physics Letters*, vol. 83, No. 25, Dec. 22, 2003, pp. 5235-5237. DOI: 10.1063/1.1635963.

Stillwell, E.P. et al. Two "Whisker" Straining Devices Suitable for Low Temperatures, *The Review of Scientific Instruments*, vol. 39, No. 2, Feb. 1968, pp. 155-157. DOI: 10.1063/1.1683303.

* cited by examiner

STRESS CELL HAVING FIRST AND SECOND ELEMENTS HAVING FIRST AND SECOND VARIABLE LENGTHS

CROSS REFERENCE TO RELATED APPLICATIONS

This application is a National Stage Application, filed under 35 U.S.C. 371, of International Application No. PCT/GB2018/051458, filed May 30, 2018, which international application claims priority to and the benefit of United Kingdom Application No. 1711384.6, filed Jul. 14, 2017; the contents of both of which as are hereby incorporated by reference in their entireties.

BACKGROUND

Related Field

The present disclosure relates to an apparatus and methods for applying a force on a sample. In particular, the present disclosure relates to a stress cell for applying a force along a single axis of the sample.

Description of Related Art

The properties of a material can be studied by applying a stress or a strain to the material. In recent years there has been a trend in various fields of physics and engineering research to apply uniaxial strains and stresses to materials to study the effects on their electrical and other properties.

To apply tunable uniaxial strain or stresses to these samples requires specially built cells sometimes referred to as strain cells or stress cells. The strain refers to the response of the material, for example a deformation of the material, to an applied stress. Such cells may be configured to measure the stress, the strain, or both the stress and the strain applied to the material.

There is a demand for stress/strain-tuning experiments performed at cryogenic temperature and/or in high magnetic field, which puts three notable constraints on the cell. Firstly, the cell must be substantially non-magnetic and be substantially unaffected by magnetic fields. Secondly, the cell must function at cryogenic temperatures, and it must be possible to vary the cell temperature widely without applying large stresses to the sample through differential thermal contraction. Thirdly, the cell should be sufficiently compact to fit into common cryogenic apparatus and magnet bores. Two common standards are a maximum diameter of 1 inch, and a maximum diameter of 2 inches.

Due to the above constraints, most currently available devices capable of applying uniaxial stress to samples, such as tensile testers, tensometer or universal testing machine are not suitable for this application.

Until recently, apparatus to apply tunable strains at cryogenic temperatures suffered from substantial limitations. In approaches based on piezoelectric actuators, the maximum force that could be applied was very low, and/or the range of strain that could be applied was very low, and/or the sample could not be kept near zero stress during cooling.

A first practical device that was compact, could tolerate cryogenic temperatures and high magnetic fields, compensated for differential thermal contraction, and could apply large strains (up to ~$10^{-2}$) and forces (up to ~100 N) is described in the article titled "Piezoelectric-based apparatus for strain tuning," published in the Review of Scientific Instruments, vol. 85, article number 065003, (2014). The device described in this article uses an arrangement of piezoelectric stacks designed to cancel thermal expansion effects. However, using such a cell, the range of stresses or strains that can be applied to a sample of a reasonable length remains limited. In addition, the device does not allow the non-destructive removal of a mounted sample, which is a severe limitation when precious samples are used.

It is an object of the disclosure to address one or more of the above-mentioned limitations.

BRIEF SUMMARY

According to a first aspect of the disclosure, there is provided a stress cell for applying a force on a sample, the cell comprising a frame; an actuator arrangement coupled to the frame; a coupler for coupling the actuator arrangement to the sample, the coupler comprising a first coupler portion connected to the actuator arrangement and a second coupler portion connectable to the sample, wherein the first coupler portion is flexibly coupled to the frame and wherein the actuator arrangement comprises a first element having a first variable length and a second element having a second variable length, the actuator arrangement being adapted to vary a difference between the first length and the second length to provide the force.

For example, the first coupler portion and the second coupler portion may be integrally formed.

For instance, the sample may extend between a first end and a second end, the frame being connectable to the first end of the sample and the second coupler portion being connectable to the second end.

For example, the first and second elements of the actuator arrangement may each be provided by one or more piezoelectric actuators.

Optionally, the first coupler portion may be flexibly coupled to the frame via a compliant mechanism allowing the coupler to move with respect to the frame upon actuation of the actuator arrangement. For example, the compliant mechanism may be a flexure or a hinge allowing the coupler to rotate with respect to the frame.

Optionally, the second coupler portion comprises a guide member connectable to the sample, the guide member being pivotably coupled to the first coupler portion. For example, the second portion may be pivotably coupled to the guide member via a compliant mechanism. The compliant mechanism may comprise a hinge. For example, the hinge may be integral to the coupler. For instance, the hinge may comprise a flexure.

Optionally, the guide member may be flexibly coupled to the frame. For example, the guide member may be coupled to the frame via one or more flexures.

Optionally, the frame comprises a first frame portion joined to a second frame portion, and wherein the first coupler portion is flexibly coupled to the frame via the second frame portion. For example, the first portion may be a U-shape portion and the second portion may be a beam portion.

Optionally, the first coupler portion may be flexibly coupled to the frame via a flexure which extends along a boundary between the first frame portion and the second frame portion, allowing the second frame portion and the first coupler portion to rotate substantially coaxially. For example, the flexure may be a flexure hinge.

Optionally, the stress cell comprises a sample plate for holding the sample, the sample plate comprising a first plate portion releasably attachable to the frame and a second plate portion releasably attachable to the coupler.

Optionally, the guide member may be provided on the sample plate. For example, the sample plate may comprise a section that forms one or more guide members.

Optionally, at least one of the first plate portion and the second plate portion is pivotally coupled to the guide member.

Optionally, the stress cell comprises a first sensor coupled to a load-bearing part of the cell, the first sensor being adapted to measure a deformation of the load-bearing part. The load bearing part is not deformed when no force is applied to the sample. For example, the load bearing part may comprise part of the frame. For instance, the deformation may be used to determine the stress applied to the sample.

Optionally, the first sensor may be adapted to measure a displacement between a first part of the frame, and a second part of the frame, wherein the first part is connectable to the sample and movable with respect to the second part. For example, the sensor may comprise a first conducting plate connected to the first part of the frame and a second conducting plate connected to the second part of the frame.

Optionally, the stress cell comprises a second sensor adapted to measure a displacement between the coupler and the frame. For example, the displacement of one or more parts of the coupler relative to the frame may be used to determine the displacement applied across the sample and hence the sample strain.

Optionally, the actuator arrangement may be provided in a first plane and wherein the sample is provided in a second plane distinct from the first plane.

Optionally, the first plane may be substantially perpendicular to the second plane.

Optionally, the first plane may be substantially parallel to, the second plane. For instance, the first plane may be substantially parallel to, but not coplanar with the second plane.

According to a second aspect of the disclosure, there is provided a method for applying a force on a sample, comprising providing an actuator arrangement comprising a first element having a first variable length and a second element having a second variable length; varying at least one of the first length and the second length to provide the force in a first plane; providing a coupler comprising a first coupler portion connected to the actuator arrangement and a second coupler portion connectable to the sample; wherein the first coupler portion is flexibly coupled to a frame.

For instance, the first length and the second length may be varied in opposite direction, and/or the first length and the second length may be varied by a different amount.

Optionally, the method comprises transferring the force from the first plane to a second plane in which lies the sample by moving the coupler with respect to the frame, wherein transferring the force comprises at least one of translating and rotating the first coupler portion with respect to the frame to displace the second portion substantially along the second plane.

Optionally, the method comprising providing a guide member pivotably coupled to the first coupler portion; and allowing the guide member to pivot with respect to the first coupler portion. By allowing the guide member to pivot with respect to the first coupler portion, rotations of the first coupler portion can be attenuated.

Optionally, wherein the first plane is substantially perpendicular to the second plane.

Optionally, wherein the first plane is substantially parallel to the second plane.

Optionally, the method comprises monitoring a deformation of a load-bearing part of the cell to determine the magnitude and sign of the force applied to the sample.

BRIEF DESCRIPTION OF THE FIGURES

The disclosure is described in further detail below by way of example and with reference to the accompanying drawings, in which:

FIG. 3(*a*) is a profile cross section of the stress cell of FIG. 2 when the actuator arrangement is at rest;

FIG. 3(*b*) is a profile cross section of the stress cell of FIG. 2 when the actuator arrangement is activated;

DETAILED DESCRIPTION OF VARIOUS EMBODIMENTS

Figure 1:
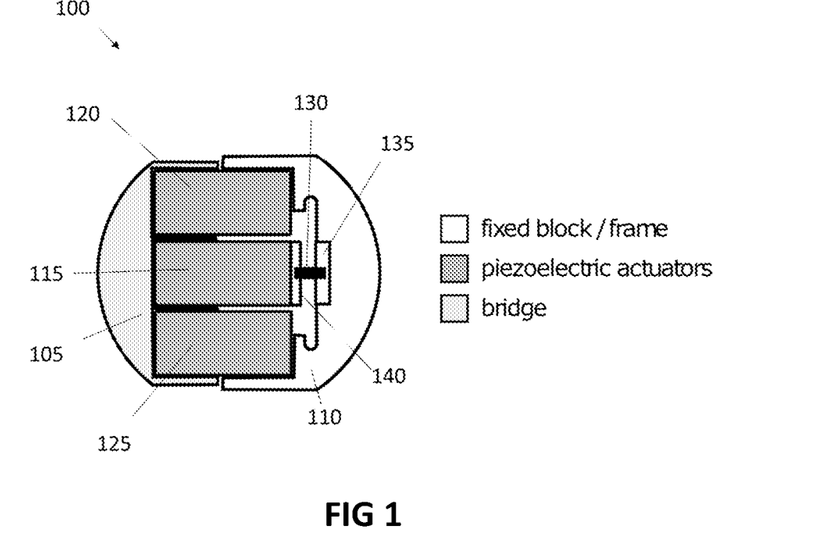
FIG. 1 is a top view of a stress cell according to the prior art.

FIG. 1 illustrates a stress cell 100 according to the prior art. The stress cell 100 includes a bridge 105 and a frame 110. Three piezoelectric actuators extend from the bridge 105. An inner piezoelectric actuator 115 is arranged in parallel between two outer piezoelectric actuators 120, 125.

A sample 130 is attached to two sample mounting blocks 135 and 140. The mounting block 140, is attached to the inner piezoelectric 115 and is movable relative to the frame 110 of the device. The mounting block 135 is affixed to the frame 110 and referred to as stationary block.

The outer actuators 120 and 125 have one end attached to the bridge 105 and another end attached to the frame 110, while the inner actuator 115 has one end attached to the bridge 105 and the other end attached to the block 140. This arrangement of the piezoelectric actuators in principle cancels the effect of differential thermal expansion/contraction between the actuators and the frame: if both the inner and outer piezoelectric stacks change in length equally, due to a common change in temperature, no net stress/strain is applied to the sample 130. This cancellation is important because in principle the actuators could be made much longer than the sample, and any differential contraction would be multiplied by the actuator length divided by the sample length. A stress may result on the sample from differential thermal contraction between the sample and the frame, however this stress can be cancelled by operating the actuators.

The outer actuators 120 and 125 in general share common electrical leads and are operated together. A positive stress/strain, also referred to as tension, is applied to the sample 130 if a difference in length is applied between inner actuator 115 and outer actuators 120 and 125, such that actuator 115 is shorter than actuators 120 and 125. Conversely, a negative stress/strain also referred to as compression is applied to the sample if a difference in length is applied between inner actuator 115 and outer actuators 120 and 125, such that actuator 115 is longer than actuators 120 and 125.

To measure the strain applied to the sample, a sensor is coupled at one end to the mounting block 140 and at the other to the mounting block 135. The sensor is sensitive to changes in length, and may contain, for example, a resistive strain gauge or a parallel-plate capacitor.

However, in the cell 100 the maximum length of the actuators 115, 120 and 125 is limited, and hence the total stroke these actuators can deliver is also restricted, which reduces the maximum strain that can be delivered to the sample. Therefore, the cell 100 is not adapted to provide a wide range of tension or compression forces which limits its applications.

Figure 2:
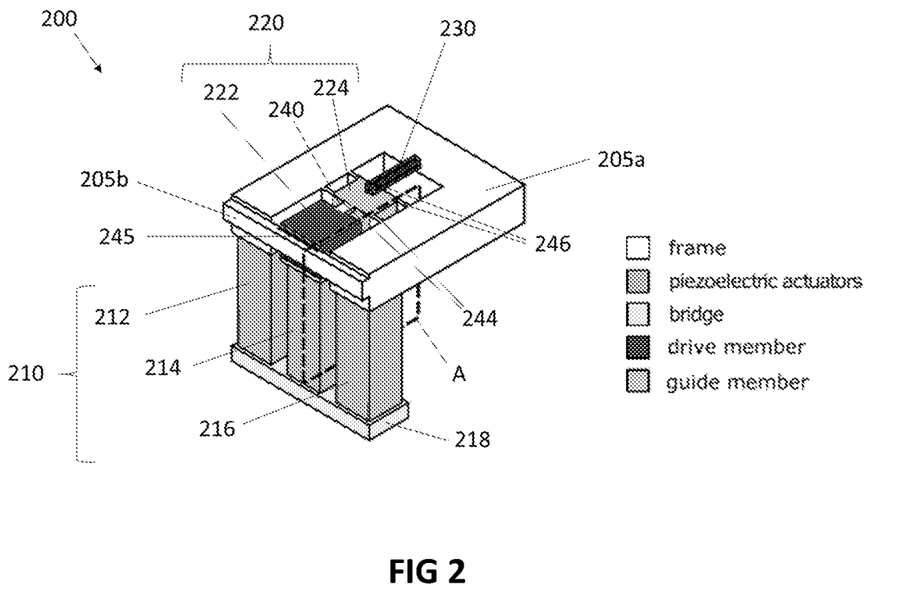
FIG. 2 is a perspective view of a stress cell provided with an actuator plane perpendicular to a sample plane.

FIG. 2 illustrates a perspective view of a stress cell 200 according to the present disclosure. The stress cell includes a frame 205, an actuator arrangement 210 coupled to the frame 205, and a coupler 220 for coupling the actuator arrangement 210 to the sample. The coupler 220 comprises a first coupler portion, also referred to as drive member 222 connected to the actuator arrangement 210 and a second coupler portion which includes a guide member 224 connectable to the sample 230.

The frame 205 is formed of a first portion 205a connected to a second portion 205b. In this example, the first portion 205a has a U shape, while the second portion 205b has a beam shape, also referred to as crossbeam. In use, the frame 205 may be bolted to a cryostat, not shown, hence allowing the frame to remain stationary. In this example, the guide member 224 is coupled to the frame 205 via two sets of flexures 244 and 246. Such flexures are used to substantially constrain the motion of the guide member 224 to be along one axis relative to the frame 205a.

The actuator arrangement 210 is formed by an inner actuator 214, and two outer actuators 212 and 216. The outer actuators 212 and 216 are connected at one end to a platform 218, also referred to as bridge, and at another end to the first portion 205a of the frame. The inner actuator 214 is connected at one end to the platform 218 and at another end to the drive member 222. The platform 218 is movable with respect to the frame 205.

The drive member 222 is pivotably coupled to the guide member 224 via a first hinge 240. The coupler 220 is flexibly coupled to the frame 205. The drive member 222 is pivotably coupled to the second portion 205b via a second hinge 245. The drive member 222 is also pivotably coupled to the inner actuator 214 via a third hinge 250 shown in FIG. 3.

The first, second and third hinges 240, 245 and 250 may be integrally formed in the material making the coupler. For instance, the coupler and the frame may be made of a substantially non-magnetic metal such as titanium. For example, a hinge can be formed by a flexible portion of material also referred to as flexure. The hinge may also be referred to as a flexure-hinge.

In this example the sample 230 extends between a first end and a second end. The sample 230 is mechanically connected at the first end to the frame 205 and at the second end to the guide member 224.

Figure 3:
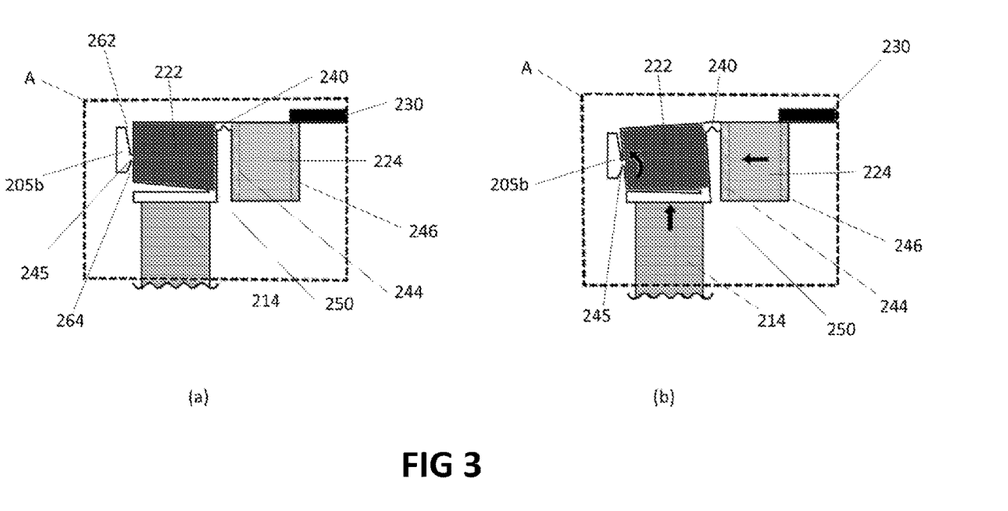

FIG. 3 shows a profile view of a cross section of the stress cell 200 of FIG. 2 obtained in the plane A. FIG. 3(a) illustrates a state of the coupler 220 when the lengths of actuators 212, 214, and 216 are equal, and FIG. 3(b) illustrates a state of the coupler 220 when actuator 214 has been extended relative to actuators 212 and 216.

In operation, the outer actuators 212 and 216 are operated together and a difference in length is applied between inner actuator 214 and the other actuators 212 and 216. For example, by applying voltages of opposite sign, the length of actuator 214 and of actuators 212 and 216 could be varied in opposite directions. In this embodiment, the actuators are arranged so that they elongate and contract in the vertical direction. During operation of the actuator arrangement 210, the second portion 205b remains stationary relative to the first portion 205a of the frame. The extension or the contraction of the inner actuator 214 displaces the hinge 250 up or down relative to the hinge 245, causing the drive member 222 to rotate. Because there is a vertical displacement between hinges 245 and 240, this rotation causes the guide member 224 to be displaced substantially horizontally.

In the example shown in FIG. 3(b), the length of the inner actuator 214 is extended, hence pressing against the coupler 220. The drive member 222 pivots towards the second portion 205b of the frame 205 in an anti-clockwise direction, hence pulling the guide member 224. The flexures 244 and 246 provide a high spring constant against rotations of the guide member 224 relative to the frame 205, and the hinge 240 provides a low spring constant for rotations of the guide member 224 relative to the drive member 222, so the guide member 224 is pulled horizontally towards drive member 222 but without substantial rotation. As a result, a tensile force is applied to the sample 230 substantially along a single axis. In this case, the single axis corresponds to a longitudinal axis of the sample. Therefore, the hinge 240 ensures that no unwanted rotations are applied to the end of the sample 230, only a displacement.

The actuator arrangement 210 may also be actuated to shorten the length of the inner actuator 214 relative to outer actuators 212 and 216. In this case the inner actuator pulls down on the coupler 220. The drive member 222 pivots in a clockwise direction. The guide member 224 is pushed rightward in a substantially horizontal direction. This results in a compression force being applied to the sample 230 substantially along a single axis.

The first, second and third hinges 240, 245 and 250 provide a compliant mechanism, allowing the coupler 220 to transfer the force received from the inner actuator 214 to the sample 230. The force is applied to the sample along a single axis. The combination of hinge 240 and guide member 224 provide weak coupling of the rotation of drive member 222 and the vertical displacement of hinge 240 to the sample. As a result, the force delivered to the sample by the guide member 224 is substantially uniaxial. For example, a linear force can be applied to the sample along the long axis of the sample. Misalignment of the applied force, and/or torque applied to the end of the sample, would result in bending the sample and reduced homogeneity of the applied stress. By preventing such a misalignment, it is possible to improve the precision with which an electronic material property of the sample can be observed.

The coupler 220 allows to redirect the force deliver by the actuator, from one plane to another. The actuator arrangement 210 and the sample 230 are located in two separate planes. In this example, the plane of the actuator arrangement 210 is perpendicular to the plane of the sample 230. Relatively long actuators may be used to achieve a high strain range. In this case the device may be longer in the vertical direction than in the horizontal direction. Such a configuration is useful in for example magnet bores, for measurements where the force and magnetic field applied to the sample are desired to be perpendicular.

As shown in FIG. 3, rotation of drive member 222 may apply a vertical displacement to the guide member 224, in addition to the desired horizontal displacement. Such a vertical displacement can be attenuated by the combination of flexures 244 and 246 and hinge 240. The vertical displacement may be further reduced or eliminated by for example lengthening the hinge 240 to lower its spring constant against relative vertical displacement of its two ends. Alternatively, or in combination the vertical displacement may be reduced by minimising the horizontal distance between hinges 245 and 240.

The flexure-hinge 245 can be obtained by cutting two slots 262 and 264 in the material forming the coupler 220 and frame 205. This should be achieved without cutting a slot between the first portion 205a and the second portion 205b of the frame, which could be difficult.

Figure 4:
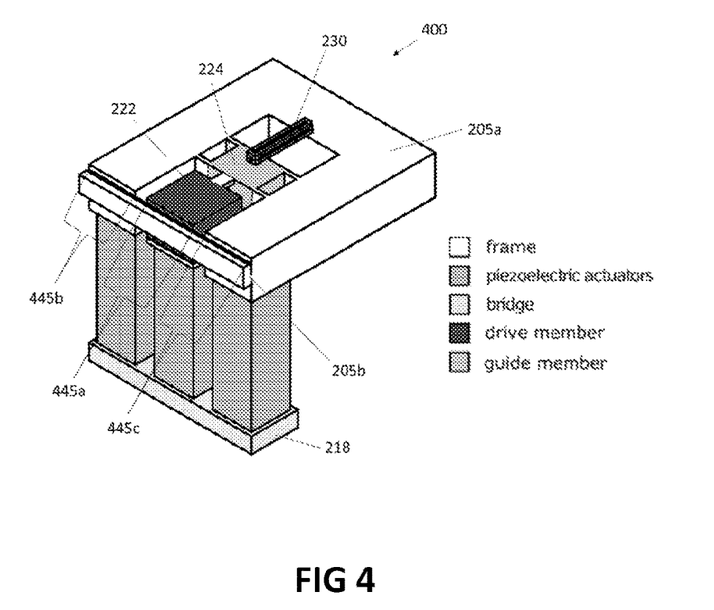
FIG. 4 is a perspective view of another stress cell.

FIG. 4 shows a perspective view of another stress cell 400, having a frame and a coupler design easier to manufacture. The stress cell 400 is similar to the stress cell 200, and same reference numerals are used to refer to the same features as in FIG. 2. In FIG. 4, the hinge 445 coupling the drive member 222 to the second portion 205b of the frame, extends along the length of the second portion 205b. This simplifies the manufacturing of the cell. The hinge 445 includes an inner section 445a located between two outer sections 445b and 445c. The hinges 445b and 445c are located between the first portion 205a and the second portion 205b of the frame. These additional outer hinges 445b and 445c are identical in profile and coaxial with the inner hinge 445a. As a result, all three hinges can be cut in a single machining operation, greatly simplifying the manufacturing process. In this case, during operation, the second portion 205b rotates relative to the first portion 205a of the frame. Introducing two coaxial hinges, rather than a single hinge will necessarily reduce the spring constant blocking motions other than the intended rotation. To partially mitigate this drawback, the hinges constituting the coaxial hinge 445 can be made thicker and stiffer than the hinge 245 of FIGS. 2 and 3 as each hinge constituting the coaxial hinge 445 will need to accommodate half the rotation of 245 for the same rotation of the drive member 222.

Figure 5:
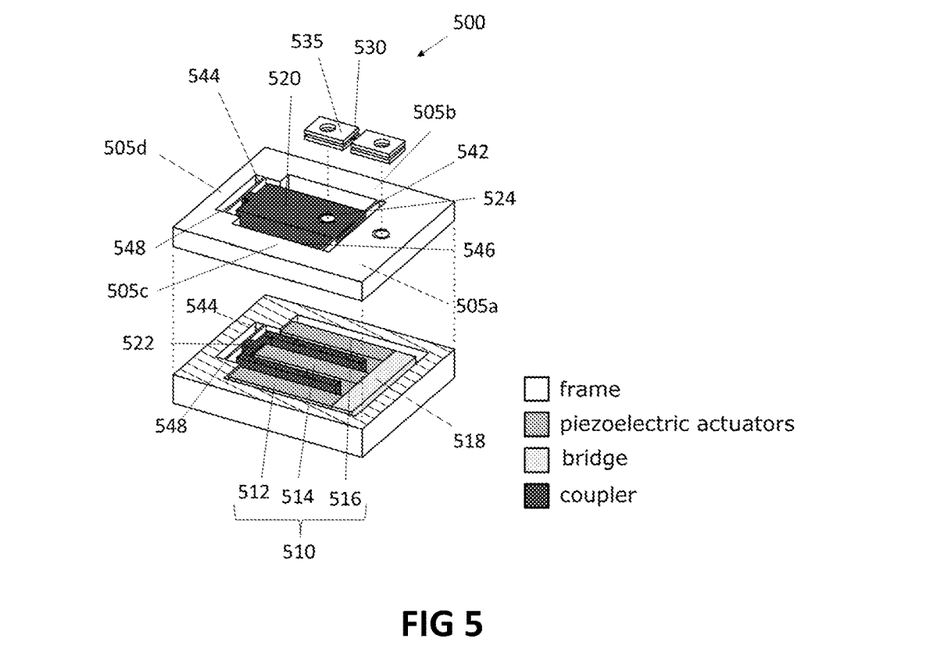
FIG. 5 is a perspective sectional view of a stress cell provided with an actuator plane parallel to a sample plane.

FIG. 5 is a sectional view of a stress cell 500 provided with an actuator arrangement located in a plane that is parallel to the sample plane. The stress cell 500 includes a frame 505, an actuator arrangement 510 coupled to the frame 505, and a coupler 520 for coupling the actuator arrangement 510 to a sample 530. The sample is provided in a sample holder 535. The frame 505 is coupled to the coupler 520 via four flexures 542, 544, 546 and 548. The frame 505 has a square shape provided by four wall portions 505a, 505b, 505c and 505d. The coupler 520 has a cuboid shape with a cuboid cut-out in the base to ensure it does not come into contact with the sides of central piezoelectric actuator 514. The coupler 520 includes a lower region 522 which is mechanically connected to the end of the central piezoelectric actuator 514 and an upper region 524 which is mechanically connected to the sample 530.

The coupler 520 is located in a cavity formed by the walls 505a, 505b, 505c and 505d of the frame 505. The flexures 542 and 544 extend from an inner surface of the wall portion 505b towards a surface of the coupler 520. The flexures 542 and 544 extend vertically downwards from the top surface of the coupler 520. In this example, the flexure 542 extends down approximately half the height of the coupler 520 whereas the flexure 544 extends the entire height of the coupler 520. Similarly, the flexures 546 and 548 extend from an internal surface of the wall portion 505c. The flexure 546 extends down approximately half the height of the coupler 520 whereas the flexure 548 extends the entire height of the coupler 520.

In this example, the actuator arrangement 510 is located in the lower portion of the space encircled by the four walls 505a, 505b, 505c and 505d that forms the frame 505. The actuator arrangement 510 is placed parallel to the direction of stress being applied to the sample but in a different plane. One end of the actuators 512, 514, 516 is attached to the bridge 518. The other end of the outer actuators, 512 and 516 is mechanically coupled to the lower portion of the part of the frame 505 comprising the wall 505d. The other end of the central actuator 514 is coupled to the lower portion of the coupler 520.

In operation, the length of the outer actuators 512 and 516 is varied relative to the length of the inner actuator 514. For example, opposite voltages of opposite sign could be applied to inner actuator 514 and to outer actuators 512 and 516, so that the lengths of the inner and outer actuators vary in opposite directions. In this embodiment, the actuators are arranged so that they elongate and contract in the horizontal direction. The extension or the contraction of the inner actuator 514 displaces the coupler 520 relative to the frame 505 in a translation motion. This translation causes the coupler 520 to be displaced substantially horizontally either towards or away from the sample 530. The flexures 542, 544, 546, and 548 substantially constrain the motion of the coupler 520 to a displacement along a single axis. In an alternative embodiment the flexures 542, 544, 546 and 548 may be replaced by other compliant mechanisms. The location of such compliant mechanisms may also be varied.

The configuration of the cell 500 allows the cell to be shorter in height, compared to the cell 200 of FIG. 2. At the same time, it allows the length of the actuators 512, 514 and 516 to extend to a large proportion of the width of the cell, allowing a more efficient use of space than if the actuators were placed in the plane of the sample. A limitation of this design however is that the cell may still apply substantial torques to the sample. When the cell is operated, a relatively large torque is applied to the coupler. The flexures are intended to resist this torque, but their combined spring constant against rotation of the coupler is non-infinite, so the coupler will still undergo some degree of rotation. This may lead to unwanted non-uniaxial stresses on the sample.

Figure 6:
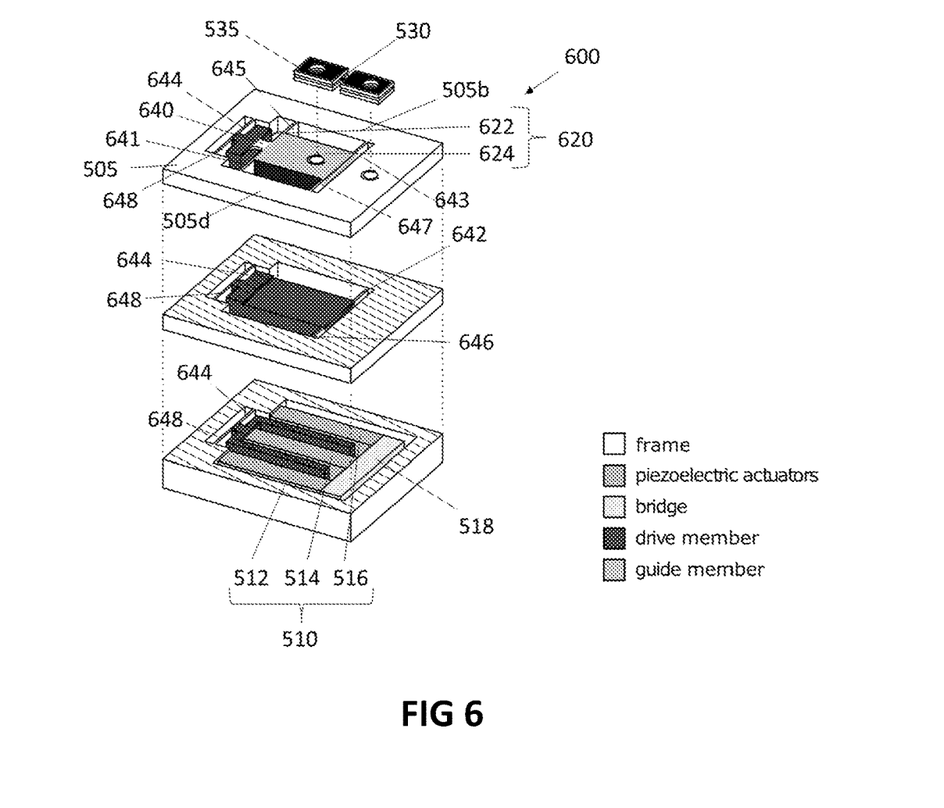
FIG. 6 is a perspective sectional view of another stress cell with an actuator plane parallel to a sample plane.

FIG. 6 is a sectional view of a stress cell 600 having a coupler design that reduces application of unwanted torque to the sample. The stress cell 600 is similar to the stress cell 500, and same reference numerals are used to refer to the same features as in FIG. 5. In FIG. 6, the coupler 620 comprises a first coupler portion, also referred to as drive member 622 connected to the actuator arrangement 510 and a second coupler portion which includes a guide member 624 connectable to the sample holder 535. The drive member 622 is pivotably coupled to the guide member 624 via a hinge 640. The drive member 622 is constrained by flexures 642, 644, 646 and 648 to move substantially uniaxially. Similarly, the guide member 624 is also constrained to move substantially uniaxially by flexure 641, 643, 645, and 647.

In an alternative embodiment, the shape of the drive member 622 may be modified such that the portion of the drive member 622 coupled to the frame 505 by the flexures 642, 646, 644 and 648 is located below the actuator arrangement 510. In this case the actuator arrangement is located directly below the guide member 624.

During operation of the stress cell 600, the actuator arrangement 510 will cause a net translation between the frame 505 and the drive member 622. This translation is then transmitted to the guide member 624 which causes a force to be exerted on the sample 530. Similarly to the operation of stress cell 500 in FIG. 5, the torque that results because the actuators and sample are not co-planar causes some rotation of the drive member 622. However, the hinge 640 presents a low spring constant for transmission of this rotation to guide member 624, and the flexures 641, 643, 645 and 647 present a high spring constant against rotation of the guide member. As a result, any rotation of the drive member due to the torque being applied to it is strongly attenuated in the guide member.

Figure 7:
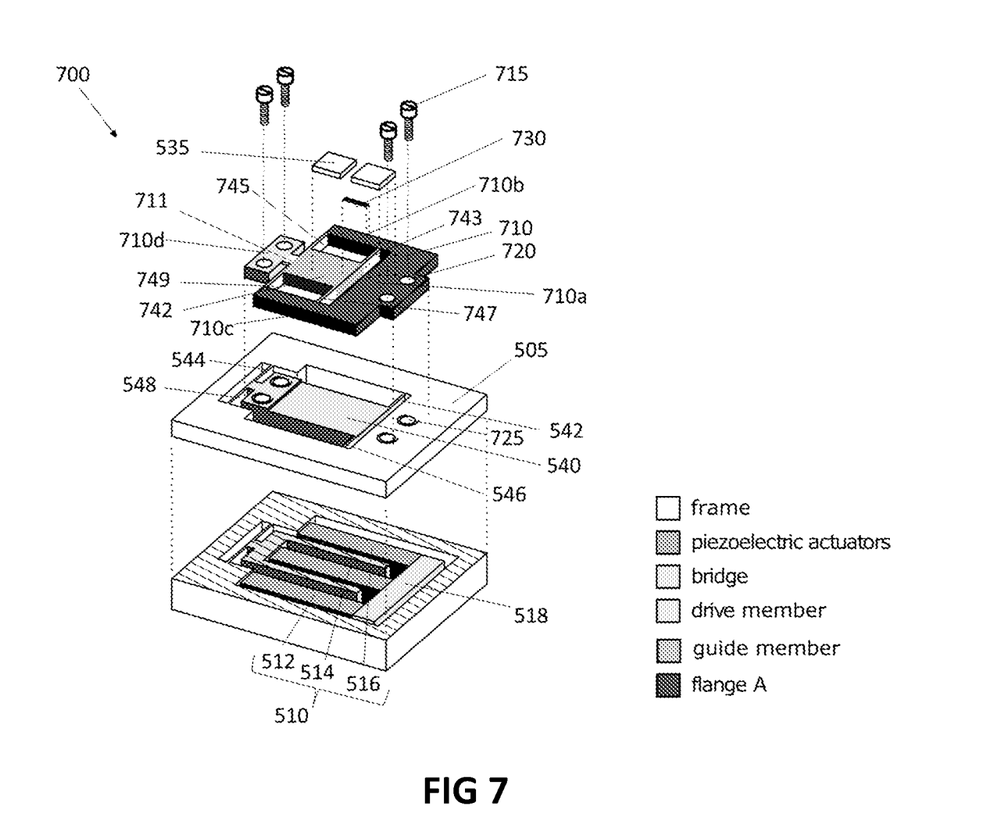
FIG. 7 is an exploded perspective sectional view of a stress cell provided with a removable plate for holding the sample.

FIG. 7 is an exploded perspective view of a stress cell 700 provided with a removable plate for holding the sample. The stress cell 700 is similar to the stress cell 500 of FIG. 5, and same reference numeral are used to refer to the same features as in FIG. 5.

In this embodiment, the stress cell is provided with a removable plate 710 which can be mounted onto the cell. The plate 710 has five sections labelled 710a, 710b, 710c, 710d and 742. The sections 710a, 710b and 710c form a U shape portion also referred to as flange A, with sections 710b and 710c extending from the section 710a. The section 742 is located between the sections 710b and 710c forming a bridge portion. The section 742 performs the role of the guide member, and is also referred to as guide member. A set of flexures 743, 745, 747 and 749 are provided at each ends of the guide member 742, allowing displacement of the guide member relative to flange A (710a, 710b and 710c).

The sample 730 is attachable onto the plate between the section 742 and the section 710a. For example, a first end of the sample may be affixed to flange 701a with epoxy, and a second end to guide member 742 with epoxy. Optionally, plates 535 may also be epoxied into place over the sample ends to further strengthen the bonds between the sample and the plate.

The section 710d is flexibly connected to the guide member 742 via flexure hinge 711. The section 710d can be fastened to the drive member 540. The plate 710 can be mounted onto an outer surface of the frame 505 and an outer surface of drive member 540. To this end, the plate 710 is provided with a plurality of apertures 720 for receiving a set of screws 715. Similarly, the outer surface of the frame 505 and on the outer surface of the guide member 524 are also provided with a plurality of holes 725. With a plurality of holes, screws 715 may be installed with for example disc springs to allow the force applied by the screws to be applied gradually. In this way, the screws could be tightened in turn so that plate 710 becomes tightly affixed to frame 505 and guide member 540 without causing flange 710a or flange 710d to rotate relative to frame 505 and guide member 540, through the torque applied while tightening the screws. In alternative embodiments the holes, apertures and screws may be replaced by alternative fastening mechanism allowing the plate 710 be releasably attached onto the frame and guide member.

In this embodiment, the guide member is provided by the section 742 of the plate 710. The drive member 540 is pivotably coupled to guide member, via the hinge 711. The hinge 711 also provides protection for the sample in case the mounting surfaces on drive member 540 and frame 505 are not perfectly co-planar, for example due to flaws in manufacture, dust on the surface, or scratches on the surface. Non-coplanarity of the mounting surfaces may apply rotation and/or displacement of flange 710d relative to flange 710a, however hinge 711 presents a low spring constant for transmission of this rotation and/or displacement to guide member 742.

The stress cell 700 permits mounting of the sample 730 separately from the actuator/frame arrangement 505 and 510. Complex processing may then be performed on the sample after it has been affixed to plate 710, but without it being attached to frame the 505. The sample 730 and plate 710 may also be conveniently removed without destruction of the sample, then later re-attached for further measurement.

Figure 8:
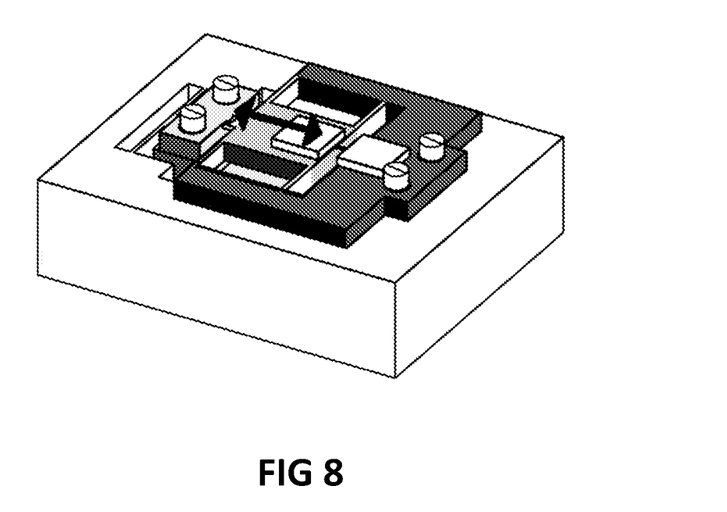
FIG. 8 is a perspective view of the stress cell of FIG. 7 with the plate mounted onto the cell.

FIG. 8 shows the cell 700 with the plate mounted.

Figure 9:
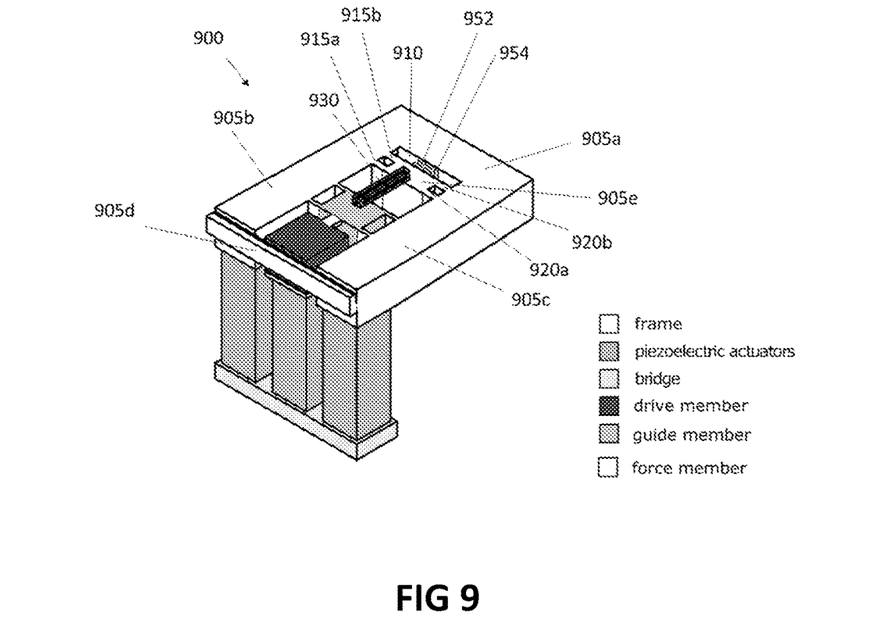
FIG. 9 is a perspective view of a stress cell provided with a force sensor.

FIG. 9 illustrates a stress cell 900 provided with a force sensor. The stress cell 900 is similar to the stress cell 400 of FIG. 4. In this case, the frame has been modified to include a force sensor. The frame 905 has a first portion 905a from which extends two parallel arms 905b and 905c. The arms 905b and 905c are terminated by a crossbeam member 905d. A recess 910 is provided within the first portion 905a of the frame, hence dividing a portion of the frame, referred to as the force member 905e from the first portion of the frame 905a. The force member 905e is coupled to the arm 905b via the flexures 915a and 915b. The force member 905e is coupled to the arms 905c via flexures 920a and 920b. The flexures 915a, 915b, 920a and 920b allow the force member 905e to move with respect to the portion 905a and the arms 905b and 905c, upon actuation of the actuator arrangement. The flexures 915a, 915b, 920a and 920b are designed to be relatively stiff to ensure that when large forces are applied to the sample 930, the force member 905e will only move by a small amount relative to the first portion 905a. Two conductive plates 952 and 954 are provided within the recess 910, hence forming a capacitor. In an alternative embodiment, the plates 952, 954 may be replaced by a piezoelectric sensor.

In operation, the coupler applies a force to the sample 930. The force is then transmitted through the sample to the force member 905e which moves by a small amount with respect to the frame portions 905a, 905b and 905c. As the force member 905e is displaced either toward or away from the frame portion 905, a distance, between the first conducting plate 952 and the second conducting plate 954 is decreased or increased. These small displacements of the force member 905e can be quantified by measuring a change in capacitance between the two conducting plates 952 and 954. This arrangement provides a convenient and accurate way of measuring the force applied to the sample 930. By knowing the force applied to the sample and the dimensions of the sample, it is possible to determine an amount of stress applied to the sample.

The force sensor described with respect to FIG. 9 may be applied to other stress cells. For instance, the force sensor may be implemented in the stress cells of FIGS. 2, 4, 5, 6, and 7.

The stress cells as described above with reference to FIGS. 2 to 9, may also be provided with a displacement sensor, configured to measure the change in distance between the guide member and the frame, or between the drive member and the frame, or between the guide member and bridge 905e. This displacement sensor may be used to estimate the strain achieved in the sample by the applied force. This displacement sensor may also be used to determine whether there is non-elastic deformation of the sample and/or any epoxy used to affix the sample to the apparatus.

Such non-elastic deformation would appear as nonlinearity in the dependence of the displacement on the applied force.

Different displacement sensors may be used for this purpose. In an exemplary embodiment, a first conductive plate is attached to the frame and a second conductive plate is attached to the guide member. The conductive plates are arranged orthogonal to the axis along which the force is applied to the sample. A capacitance value can then be measured between the first plate and the second plate. The measured capacitance varies as a function of 1/d where d is the spacing between the conductive plates. Therefore, it is possible to extract the distance between the plates based on the capacitance value.

The additional features designed to detect the force applied to the sample, as shown in in FIG. 9, increase the cost and complexity of the device. A simpler design may be provided by detecting a deformation that occurs in the load-bearing portions of the stress cell.

Figure 10:
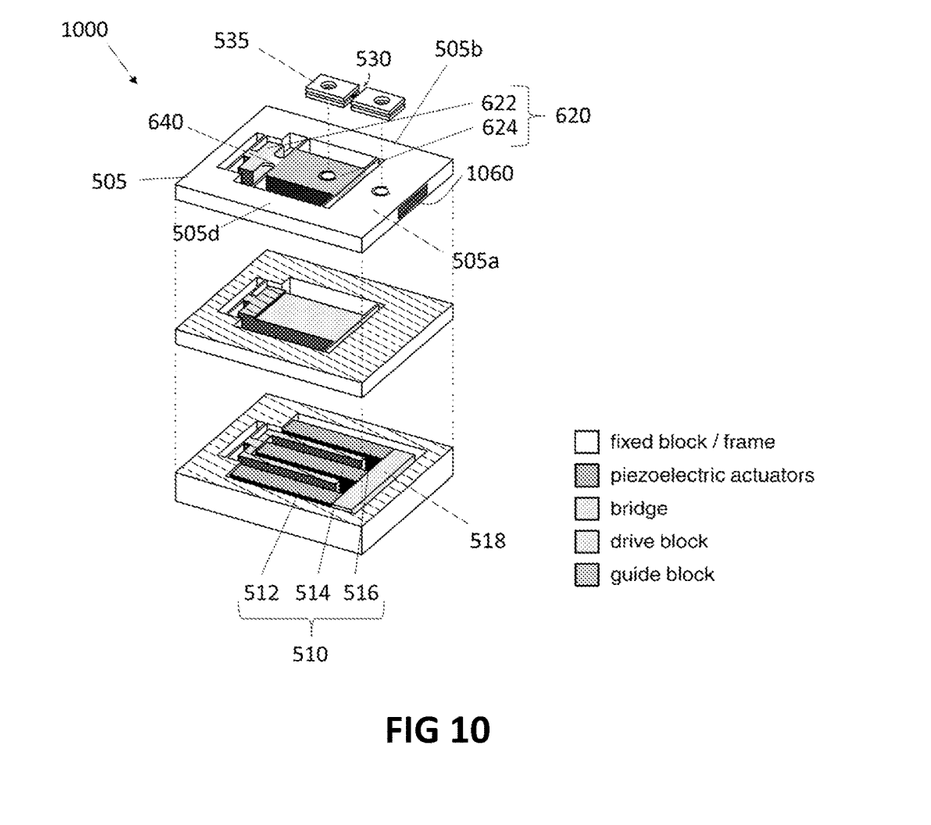
FIG. 10 is a perspective sectional view of a stress cell provided with a strain sensitive element.

FIG. 10 is a perspective sectional view of another stress cell 1000 along three transversal planes of the cell. The stress cell 1000 is very similar to stress cell 600 of FIG. 6 and same reference numerals are used to refer to the same features as in FIG. 6. The stress cell 1000 incorporates an additional strain sensitive element 1060 located on the external surface of the frame portion 505a. The strain sensitive element 1060 may be a strain gauge for detecting the strain in the surface it is affixed to. During operation, a uniaxial force is applied to the sample 530. This force is transferred through the sample to the frame portion 505a. Any force applied will cause a small deformation, even to a stiff member such as 505a. This small deformation towards or away from the sample can be detected by a change in the surface strain detected by the strain sensitive element 1060 and will be directly proportional to the sample strain. In this way, the stress cell 1000 represents a simple way to measure sample strain without having to introduce the additional features described in stress cell 900 of FIG. 9.

Figure 11:
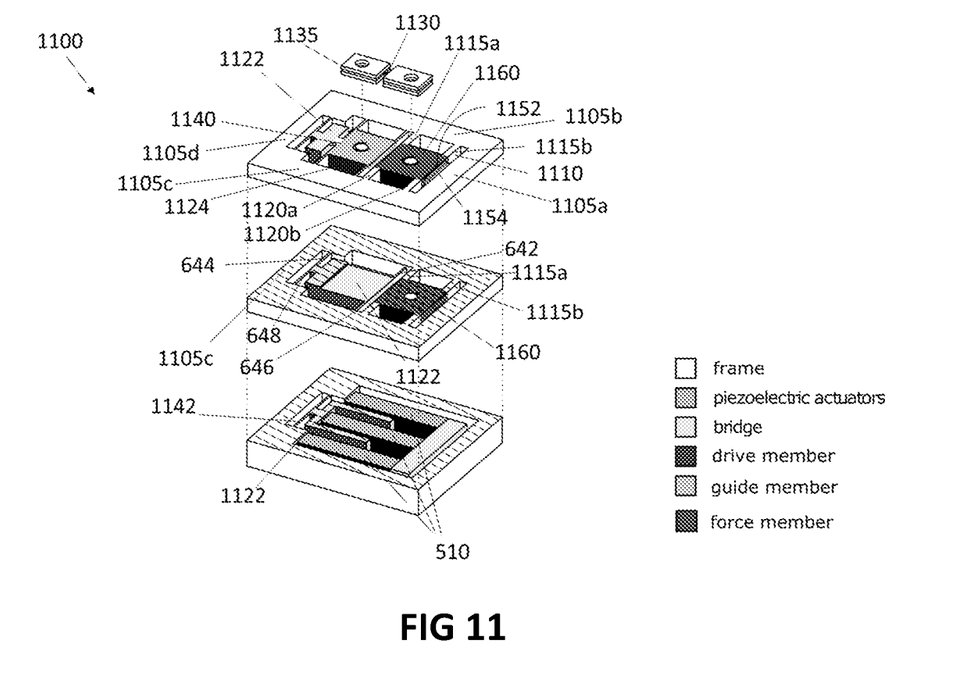
FIG. 11 is a perspective sectional view of a yet another stress cell.

FIG. 11 illustrates a perspective sectional view of yet another a stress cell 1100 along three transversal planes of the cell. In this embodiment, the drive member has been made shorter to allow the fitting of an additional force member 1160 within the housing of the cell. The cell 1100 is similar to the cell 600 of FIG. 6. For brevity only the modified features of the cell will be described. Same reference numerals are used to refer to the same features as described in FIG. 6.

The stress cell 1100 includes a frame 1105, an actuator arrangement 510 and a coupler 1122,1124 for coupling the actuator arrangement to the sample 1130. The coupler includes a drive member 1122 connected to the actuator arrangement 510. The drive member 1122 is connectable to the guide member 1124, through flexure hinge 1140. The guide member 1124 is also connectable to sample 1130 through sample holder 1135. The guide member 1124 and drive member 1122 may be shorter than the parts 624 and 622 of the cell of FIG. 6. The drive member 1122 is coupled to the frame 1105 via four flexures 642, 644, 646 and 648 previously described with respect to FIG. 6. The frame 1105 forms a housing provided with a cavity which encloses in part the actuator arrangement 510, the drive member 1122, the guide member 1124 and the force member 1160.

The frame 1105 has a first portion 1105a from which extends two parallel arms 1105b and 1105c. The arms 1105b and 1105c are terminated by a end portion 1105d. A recess 1110 is provided within the first portion 1105a of the frame, hence dividing a portion of the frame, referred to as the force member 1160, from the first portion of the frame 1305a. The force member 1160 is coupled to the arm 1105b via the flexures 1115a and 1115b. The force member 1160 is coupled to the arm 1105c via flexures 1120a and 1120b. The flexures 1115a, 1115b, 1120a and 1120b allow the force member 1160 to move with respect to the portion 1105a and the arms 1105b and 1105c, upon actuation of the actuator arrangement 510. The flexures 1115a, 1115b, 1120a and 1120b are designed to be relatively stiff to ensure that when large forces are applied to the sample 1130, the force member 1160 will only move by a small amount relative to the first portion 1105a. Two conductive plates 1152 and 1154 are provided within the recess 1110, hence forming a capacitor. By measuring the capacitance between these plates, the displacement of the force member 1160 can be measured and hence the force applied to the sample 1130 can be determined.

In the embodiments that include a removeable sample plate, such as stress cell 700 in FIG. 7, it is sometime desirable for the sample plate to be designed to mitigate the effect on the sample of imprecise alignments when the sample plate is affixed to the rest of the device.

Figure 12:
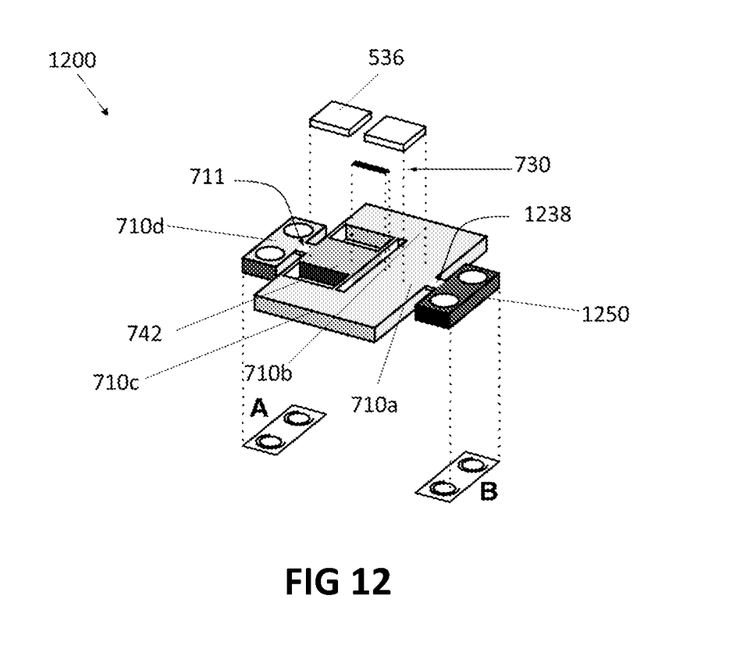
FIG. 12 is a perspective view of a sample plate.

FIG. 12 shows an example of another sample plate 1200. The sample plate 1200 is similar to sample plate 710 of the cell 700 of FIG. 7. For brevity only the modified features of the cell will be described. Same reference numerals are used to refer to the same features as described in FIG. 7. The principle difference between sample plate 1200 and sample plate 710 of FIG. 7, is that the sample plate portion 710a does not directly attach to the frame portion of the stress cell but instead is coupled to a flange 1250 through an additional flexure-hinge 1238. The flange 1250 can then be reversibly attached to the frame 505 using bolts as shown in FIG. 7.

Introducing the flange 1250 and the addition flexure-hinge 1238 permits the sample plate 1200 to tolerate more significant vertical and horizontal misalignments of the plate compared to sample plate 710 of FIG. 7 when the sample plate is bolted onto the corresponding stress cell. This is because much of the misalignment will be taken up in the flexure hinge 1238 rather than it being transferred to the sample.

Figure 13:
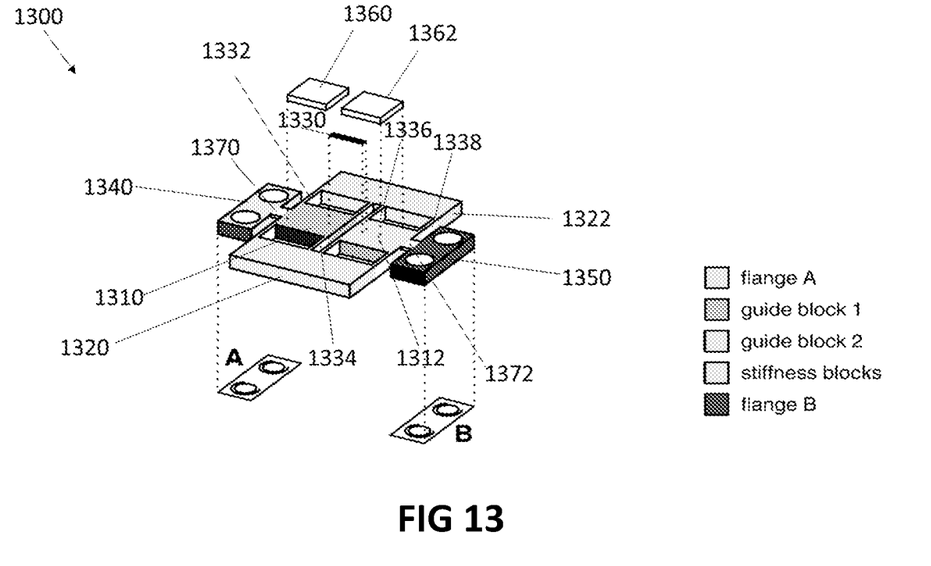
FIG. 13 is a perspective view of another sample plate.

FIG. 13 shows an example of a sample plate 1300 provided with a plurality of guide members. The sample plate 1300 includes a first linear member 1320 and a second linear member 1322, also referred to as stiffness blocks, arranged in parallel. A first guide member 1310 is coupled to the first and second linear members 1320, 1322 via a first set of flexures 1332 and 1334. A second guide member 1312 is coupled to the first and second linear members 1320, 1322 via a second set of flexures 1336 and 1338. A first flange 1340 is coupled to the first guide member 1310 via a fifth flexure, also referred to as hinge 1370. A second flange 1350 is coupled to the second guide member 1312 via a sixth flexure also referred to as hinge 1372. The first and second flanges 1340, 1350 are attachable to the coupler and to the frame, not shown, via a set of holes. The sample 1330 is attachable onto the plate between the first guide member 1310 and the second guide member 1312, for example via a sample holder that includes the plates 1360 and 1362. In an alternative example, not shown, the sample plate 1300 is provided with a single linear member.

A skilled person will appreciate that variations of the disclosed arrangements are possible without departing from the disclosure. For instance, although the stress cells of the present disclosure have been described using an actuator arrangement made of three actuators, cells may be designed with just two actuators or more than three actuators. As long as the net strain applied to the sample is produced with one actuator or a set of actuators that is elongated or shortened with a differing magnitude to another actuator or set of actuators, but no sample strain is produced when all the actuators are extended so as to cancel thermal effects. The actuator arrangement could also be provided by two pairs of actuators. In this case a strain/stress may be produced when one pair is extended and the other pair is retracted. The actuators can be of different types for example the actuators may be piezoelectric actuators. Accordingly, the above description of the specific embodiment is made by way of example only and not for the purposes of limitation. It will be clear to the skilled person that minor modifications may be made without significant changes to the operation described.

The invention claimed is:

1. A stress cell for applying a force on a sample (230, 530), the cell comprising:
a frame (205, 505);
an actuator arrangement (210, 510) coupled to the frame (205, 505); and
a coupler (220,620) for coupling the actuator arrangement (210,510) to the sample (230,530), the coupler (220, 620) comprising a first coupler portion (222,622) connected to the actuator arrangement (210,510) and a second coupler portion connectable to the sample, wherein:
the first coupler portion (222,622) is flexibly coupled to the frame (205,505);
the actuator arrangement (210,510) comprises a first element having a first variable length and a second element having a second variable length, the actuator arrangement being adapted to vary a difference between the first length and the second length to provide the force; and
the second coupler portion comprises a guide member (224,624) connectable to the sample (230,530), the guide member (224,624) being pivotably coupled to the first coupler portion (222,622).

2. The stress cell as claimed in claim 1, wherein the first coupler portion (222, 622) is flexibly coupled to the frame (205, 505) via a compliant mechanism allowing the coupler (220, 620) to move with respect to the frame (205, 505) upon actuation of the actuator arrangement (210, 510).

3. The stress cell as claimed in claim 1, wherein the guide member (224, 624) is flexibly coupled to the frame (205, 505).

4. The stress cell as claimed in claim 1, wherein:
the frame (205) comprises a first frame portion (205a) joined to a second frame portion (205b), and
the first coupler portion (222) is flexibly coupled to the frame via the second frame portion (205b).

5. The stress cell as claimed in claim 4, wherein the first coupler portion (222) is flexibly coupled to the frame (205) via a flexure (445) which extends along a boundary between the first frame portion (205a) and the second frame portion (205b), allowing the second frame portion (205b) and the first coupler portion (222) to rotate substantially coaxially.

6. The stress cell as claimed in claim 1, further comprising a sample plate (710) for holding the sample (730), the sample plate comprising a first plate portion (710a) releasably attachable to the frame (505) and a second plate portion (710d) releasably attachable to the coupler.

7. The stress cell as claimed in claim 6, wherein the guide member (742) is provided on the sample plate (710).

8. The stress cell as claimed in claim 7, wherein at least one of the first plate portion (710a) and the second plate portion (710d) is pivotally coupled to the guide member (742).

9. The stress cell as claimed in claim 1, further comprising a first sensor coupled to a load-bearing part of the cell, the first sensor being adapted to measure a deformation of the load-bearing part.

10. The stress cell as claimed in claim 9, wherein:
the first sensor is adapted to measure a displacement between a first part (905e) of the frame and a second part (905a) of the frame, and
the first part (905e) is connectable to the sample (930) and movable with respect to the second part (905a).

11. The stress cell as claimed in claim 1, further comprising a second sensor configured to measure a displacement between the coupler and the frame.

12. The stress cell as claimed in claim 1, wherein:
the actuator arrangement (210) is provided in a first plane;
the sample (230) is provided in a second plane distinct from the first plane; and
the first plane is substantially perpendicular to the second plane.

13. The stress cell as claimed in claim 1, wherein:
the actuator arrangement (510) is provided in a first plane;
the sample (530) is provided in a second plane distinct from the first plane; and
the first plane is substantially parallel to the second plane.

14. A method for applying a force on a sample and comprising the steps of:
providing an actuator arrangement (210, 510) comprising a first element having a first variable length and a second element having a second variable length;
varying at least one of the first length and the second length to provide the force in a first plane;
providing a coupler (220, 620) comprising a first coupler portion (222, 622) connected to the actuator arrangement (210) and a second coupler portion connectable to the sample (230, 530), wherein the first coupler portion (222, 622) is flexibly coupled to a frame (205, 505);
providing a guide member (224, 624) pivotably coupled to the first coupler portion (222, 622); and
allowing the guide member (224, 624) to pivot with respect to the first coupler portion (222, 622).

15. The method as claimed in claim 14, further comprising the step of transferring the force from the first plane to a second plane in which lies the sample (230, 530) by moving the coupler (220, 620) with respect to the frame (205, 505), wherein the step of transferring the force comprises at least one of translating and rotating the first coupler portion (222, 622) with respect to the frame to displace the second portion substantially along the second plane.

16. The method as claimed in claim 15, wherein the first plane is substantially perpendicular to the second plane.

17. The method as claimed in claim 15, wherein the first plane is substantially parallel to the second plane.

18. The method as claimed in claim 14, further comprising the step of monitoring a deformation of a load-bearing part of the cell to determine the magnitude and sign of the force applied to the sample (230).

* * * * *